April 19, 1949.  J. C. HORMEL  2,467,529
PROCESS FOR PRODUCING LARD-LIKE PRODUCT
Filed Jan. 4, 1945
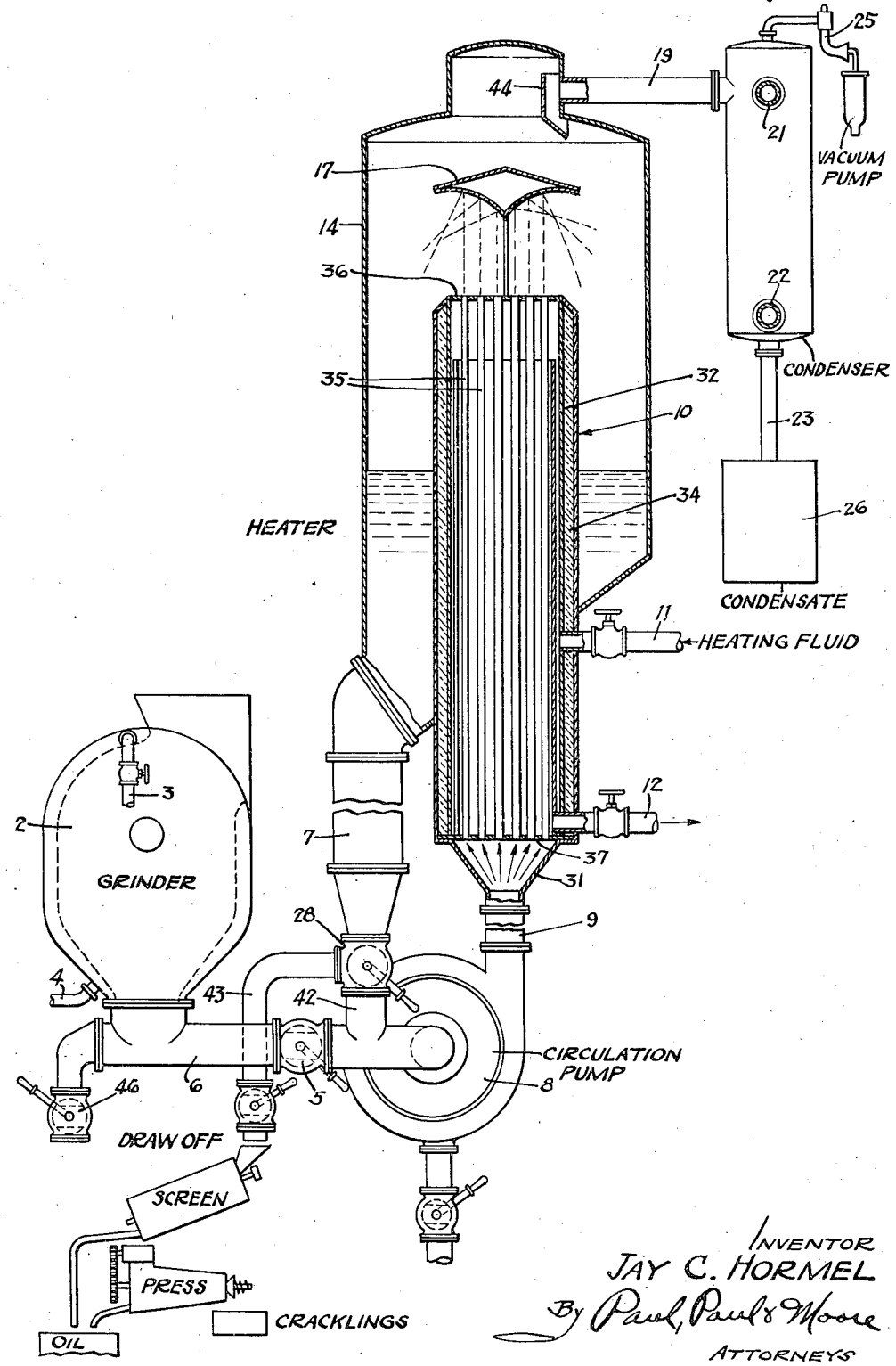
INVENTOR
JAY C. HORMEL
By Paul, Paul & Moore
ATTORNEYS Patented Apr. 19, 1949

2,467,529

UNITED STATES PATENT OFFICE 2,467,529

PROCESS FOR PRODUCING LARDLIKE PRODUCT

Jay C. Hormel, Austin, Minn., assignor to Geo. A. Hormel & Company, Austin, Minn., a corporation of Delaware Application January 4, 1945, Serial No. 571,252

7 Claims. (Cl. 260—412.6)

This invention relates to the rendering or extraction of fats or oils from animal fat tissue, and pertains particularly to the production of lard. The present application is a continuation-in-part of my copending application Serial No. 440,408, filed April 24, 1942, now abandoned.

A general object of this invention is the provision of a method for use on a commercial scale for the recovery of animal fat or quantity production of an edible and nutritious lard or lardlike product which is neutral as to taste, colorless and of clear white appearance and devoid of "animal," "cooked" or other odor.

It is also an object of the invention to provide a method for producing lard having a materially higher smoke-point than lard rendered according to traditional processes and a lard which is much less susceptible to darkening when used as a deep cooking or frying fat. It is also an object to provide a method of commercially producing lard of superior stability and keeping quality, substantially free of constituents inductive of rancidity deterioration or modification.

A particular object is the provision of such a method whereby the oil content of adipose tissue of animals may be separated from the other components of such tissue and the oil recovered in approximately its natural condition and constitution, without deleterious modification resulting from or as a concomitant or sequela of the extracting or rendering treatment.

Another particular object of the invention is the provision of a method wherein the recovery of the oil content of adipose tissue may be accomplished very rapidly and on a quantity-production scale, and a very large proportion of the fat content of the natural tissue may be recovered at low operational cost, without excessive heating, and while effectively safeguarding the product from pollution, contamination and deleterious agencies and influences.

A special object of the invention is the provision of a method which may be used commercially for quantity production of lard or lardlike product having the desirable characteristics above mentioned, from a heterogeneous mixture of all cutting and killing fats customarily obtained in the commercial slaughtering of hogs, as distinguished from selected grades of fat generally regarded as superior for the production of lard. Thus by this invention it is possible to produce edible and nutritious, white, tasteless, lard free from any objectionable odor, having a very high smoke point and very long keeping time, from all of the adipose tissue of hogs, thus utilizing not only the choice "leaf lard" tissue but also the less desirable ruffle fat, veil fats, hand facings, back fat, and certain head fats. By this invention much fatty tissue, heretofore relegated to soap stock, may be utilized for the much more commendable purpose of human food.

Other and further objects and advantages of the methods of the present invention are those inherent in the invention hereinafter described, illustrated and claimed.

To facilitate explanation and description of a procedure which conforms with my present invention, I show in the accompanying drawing, and hereinafter described, a type of apparatus in which it may be practiced and carried out. It is to be understood, however, that the purpose of this showing and description of apparatus and operations is merely illustrative as the procedure may be carried on by other specific forms of apparatus operating in fashions differing from this in various particulars. Hence, it is to be understood that the invention as defined in the appended claims is not to be regarded as limited to this particular fashion of performing the various steps or operations.

The drawing is a schematic illustration of one apparatus whereby the method of the present invention may be carried out, the showing being in the nature of an elevational view with parts in section, but without uniformity as to proportions or in regard to specific form.

On the average, the carcasses of hogs slaughtered for the purpose of meat packing usually contain a comparatively large proportion of fatty tissue that cannot be sold as a part of consumer cuts. Such tissue is widely distributed in the body of the animal, and is commonly designated in accordance with its anatomical location. Various kinds of this fat are cut from the carcass as a part of the dressing operation immediately after slaughtering, and hence are generally referred to as "killing fat." This includes fatty tissue commonly identified as leaf, ruffle, ham facings, black gut, caul, head, scrapings, etc., etc. Other fat portions are taken from the carcass at the time it is cut, and hence are referred to generally as "cutting fat" and include fatty tissue commonly referred to as back, ham, plate, and belly fat.

The fatty tissue taken from different parts of the same animal varies in numerous particulars, for example, as to the relative proportions of fat, protein and water contained therein, the character of the protein structure or connective tissue in which the fat itself is held, and even as to the constitution of the fat itself. These differences in structure and composition of the fatty tissue are reflected as differences in the characteristics of the end products when a given fat recovering treatment is applied to the different kinds of fatty tissue. When using traditional rendering methods the quality of the lard varies quite widely, depending upon the type of fatty tissue used. Hence, for the production of a high quality lard, it has heretofore been regarded as advisable to select and treat only the choicer kinds of the body fat tissue, because all of the different kinds of tissue are not equally amenable to the same treatment, and efforts on the one hand to obtain recovery of a large percentage of the fat has been found to produce undesirable results in the characteristics of the product, or has necessitated a variety of additional treatments involving additional cost and, in some instances objectionable ancillary reactions.

One of the special advantages of my method resides in the fact that by its use the packer is able to obtain a final lard product having all of the above-mentioned desirable characteristics from a heterogeneous mixture of fat tissues and at the same time obtain a high percentage of fat recovery. All this may be accomplished without special or additional treatment for removal of color, odor, taste, or other undesirable characteristics.

Described generally, my invention resides in a procedure in which suitable adipose tissue of animals such as wholesome fatty tissue of hogs, is first reduced to a structural condition which will facilitate the handling of the tissue as a slurry when slightly warmed. This may be accomplished by hashing or grinding the fatty tissue into quite small pieces. This working causes some fluidity but a slight additional amount of heat may be added at this stage to make the mass sufficiently fluid to be pumped. When so structurally modified, the material should be in the form of a pulp which may be handled or flowed in the manner of a fairly thick fluid or slurry.

Promptly after being reduced to this flowable condition, the material is heated to a temperature in excess of the melting or flow point of the fat content of the tissue but under conditions such as to prevent the tissue from reaching a temperature at which enzymatic action will be seriously expediated or either the fat or the protein tissue denatured by the heat in a manner or to a degree such as to produce discoloration, deleterious flavor or perceptible odor in the product or result in lowering of its smoke point. This heating is accomplished very quickly but under conditions which preclude over-heating and in which contact of air with the material is largely prevented. It is desirable in this quick heating to raise the temperature of the material as high as possible within the limits herein indicated, preferably to a point approximating 120° F. but not exceeding approximately 126° F. Preferably this heating is accomplished by flowing the material along a heat transfer surface which is heated to a temperature approximating 126° F., and in instances where a considerable volume of material is being processed, it is highly desirable that only fractional portions of the total quantity be heated at a time and that they be heated apart from the balance which meanwhile may be kept at a lower temperature. Promptly after being thus heated, the material is dispersed or diffused in space in a highly subdivided condition, such as a shower of droplets or particles, under conditions such that the particles or droplets are exposed to a surrounding pressure that is below the vapor pressure of water at the temperature to which the slurry had immediately theretofore been heated. As a consequence, some of the moisture in the material is immediately evaporated from the slury in its highly subdivided condition. The moisture vapors thus produced are immediately removed from proximity with the material.

This sudden evaporation of moisture from the highly subdivided material has at least two important results. In the the first place, the removal of the moisture from the particles of fat-carrying tissue has the effect of freeing a quantity of their contained fat. The reason for this is not entirely understood. This may be due to the forcing out of some of the fat by evaporation of the moisture within their cellular structure, or it may be due to a shrinking of the structural tissues as a result of removal of the water. Again, the removal of the moisture may have the effect of reducing the adsorptive or mutual wetting power of the fat and tissue. Whatever the reason, the evaporation of moisture from the tissue brings about a release of some of the fat of the cellular structure of the tissue, and this fat, being melted to an oil, maintains the fluidity of the mass.

Another important effect resulting from such evaporation of the moisture is an immediate cooling of the solid tissue and melted or fluid fat in the recently heated and dispersed portion of the batch. This is important because it definitely limits the time during which the material is held at the higher temperature and this safeguards the batch against deleterious action of the heat. For reasons of expediency, such as facility of handling as hereinafter described, the procedure must be controlled in a fashion so as to prevent this cooling being carried to the point where the melted fat or oil will set into a solidified or pasty condition, as distinguished from a fluid or flowable condition. One way in which to accomplish this result is to remove the melted fat and the tissue solids quickly from the locality in which the evaporation takes places and to bring the dispersed droplets and particles together. This coalescing of the material serves to deter further loss of heat from it, and in this fashion, the general bulk or body of pulp, which comprises the released fat (oil) and the solid particles which still retain a quantity of their original moisture content and a portion of their original fat content, is maintained in a fluid or flowable condition such that it may be subjected to further cyclic reheating by again being flowed over the heat transfer surfaces as before, and its temperature again raised within the limits and under conditions above described, so that after being thus reheated, it may again be exposed in a dispersed or highly subdivided condition at a pressure less than the vapor pressure of the water in the reheated material.

The procedure of heating, dispersing, evaporating, cooling and coalescing the pulp may be repeated cyclically, a quantity of the moisture being removed from the fatty tissue in each cycle and additional quantities of the fat (oil) released at each repetition of the evaporating step.

The process may be carried on continuously by treating fractions of a batch of pulp successively, each fraction being drawn from and then returned to the bulk of the batch while the latter is maintained at a temperature such that the pulp is kept fluid but at a temperature low enough that the proteins are not harmfully modified or enzymatic modification of the fat permitted as might likely occur at the higher temperature in the heating stage. These safeguards may be maintained by holding the bulk of the pulp at a temperature such that there will be but little if any dewatering of the solids in the bulk, for example, a temperature at which the vapor pressure of the water in the pulp does not materially exceed the external pressure.

Evaporation of moisture from the tissue in the fluid pulp is carried on in this fashion until the moisture remaining in it is reduced within the range of 18% to 26% of the weight of the total residue or cracklings after pressing as hereinafter described. While the processing of a batch is under way, a sample may be withdrawn, the oil pressed out mechanically and the moisture of the cracklings determined. The cracklings can never be pressed completely free of oil, as can be done by solvent extraction of the sample. The desired proportion of moisture is approximately 25% to 35% of the weight of the fat-free pulp solids when the sample is solvent extracted and the cracklings are hence "fat-free."

The retention of the stated proportion of moisture in the solids is important because if the tissues are dried too much, as to a point where their moisture content is in smaller proportion than the minimum stated above, the tissues have an increased affinity for the fat (oil), and consequently the separation of the oil from the tissue in the ensuing pressing or centrifuging operation is more difficult. On the other hand, if the quantity of moisture left in the tissue materially exceeds 35% of the weight of the fat-free solids, the material takes on some of the characteristics of a gel, most noticeably in that while some of the oil will separate and run off the tissue merely by gravity, it is never-the-less practically impossible to remove the remaining fat by any feasible commercial procedure such as pressing or centrifuging. In this "gel" condition, the solid tissue is soft and yieldable and passes through the straining openings of a press along with the oil. An experienced operator using my method soon is able to gauge the sufficiency of water removal by the way test samples of slurry "handle." If the slurry retains its "gel" characteristic, not enough water has been removed and the process is carried on until the samples of slurry can be pressed easily. Then the process is stopped and the batch is pressed. In case of an "over-run" the removal of too much water has no ill effect beyond increase in processing cost and decrease in the percentage of oil recovered from the cracklings.

For best recovery I try to maintain the residual moisture between 19% to 22% of the weight of the pressed cracklings, or stated another way, the residual moisture should be from 26% to 30% of the weight of the fat-free tissue solids in the pulp withdrawn for testing during the run.

When the moisture content of the material has been reduced to the range stated, the pulp or slurry will have attained greater fluidity than it did in its original condition because of the increase of free oil therein, and at a temperature at which the oil content thereof is fluid, it will have a free-flowing consistency, like a thin slurry. It has a pink to red color, due to the presence of red blood corpuscles in the particles of entrained tissue. These, as well as such other pigmentation as may be present are not deleterious for they are retained in the solid particles of tissue along with residual moisture. Consequently, the material is now in condition for the separating step wherein the particles of tissue, with their residual moisture and pigment content, are removed from the fluid fat (oil).

This separation should be accomplished as promptly as possible after the moisture content of the material has been reduced to the range stated above, and it may be carried out in any of well known fashions, the partially dehydrated slurry being maintained at a temperature at which the fat remains fluid. For example, the slurry may be centrifuged in a Bird Machine Company centrifuge or any similar machine or may be pressed out in a screw press as illustrated in the drawings. In either way the separation of the oil may be made with good results. The liquid fat (oil) removed by the centrifuge, or press may then be clarified by freeing it from any entrained solid particles; or, either after centrifuging or without centrifuging, it may be subjected to pressing, as under a pressure of 2000 pounds per square inch in commercial apparatus of conventional types. By such treatment, additional quantities of oil may be separated from the residual tissue of the adipose tissue.

If the proper moisture content has been attained, the residual oil content usually may be reduced to 3% to 8% of the weight of the press cake. Variations in the proportion of residual oil remaining after this treatment result primarily from variation in the residual moisture content of the tissue, for as stated above, if the moisture content is too far reduced, a greater retention of oil will result. Of course, even these relatively small residual quantities of oil may be extracted by known procedures, such as solvent extraction. However the cost of further extraction is usually out of proportion to the value of the oil recovered. In the present method I am concerned with procedures which are economically feasible for commercial practice. After such pressing the oil may be cleared of any remaining solid particles by filter pressing in conventional fashion, using for example a stone filter and filter aid such as diatomaceous earth.

The oil (fat) separated from the tissue solids as above described requires no further treatment for purification, decoloration, deodorizing or sterilization in order to constitute a white, odorless and flavorless (neutral) product suitable for use wherever those characteristics are essential or of importance. Thus lard produced from hog fat by the instant process has exceptional merit in culinary uses, as shortening, frying fat, as a substitute for oleomargarine, and in cosmetics and pharmaceutical preparations. The fluid fat (oil) sets to a solid simply by cooling to room temperatures.

The solid tissue remaining after the oil is centrifuged or pressed out has sometimes been referred to herein as "cracklings" for want of a better word. This solid tissue residue is actually very different than the browned or fried "cracklings" produced in traditional lard rendering processes. The tissue residue of my process is red to pink in color; it is not "cooked" nor appreciably denatured; it does not have a fried or crunchy texture, but on the contrary seems much like ground pork meat in color and texture; it contains 3% to 8% fat or sometimes slightly more on an "off-batch" where the dehydration was carried too far and oil separation hence made more difficult. It has usually about 18% to 26% water content and the remainder, aside from the fat content is protein and minerals. It is a very wholesome and worthwhile meat product suitable for admixture to sausage or direct use as a meat product.

The solid components of the fat-bearing tissue of hogs and the components which become solid when heated, appear to be composed largely of proteins. My work in the rendering of lard leads me to believe that discoloration and the development of undesirable taste and odor in lard are due to certain modifications of some or all of the proteinaceous components which occur incident to heating them. I have ascertained that these undesirable effects become apparent when the animal fat tissue is heated to temperatures above approximately 126° F. in contact with a hot surface or when it is retained at such an elevated temperature for an extended period in contact with air. Hence, an important feature of the present invention is the limitation of the heating of the fatty tissue to a temperature not substantially in excess of 126° F., but at the same time heating it to a degree sufficient to produce evaporation of moisture from the tissue when it is exposed immediately afterwards in a dispersed or highly subdivided condition at a pressure below the vapor pressure of water at the temperature of the tissue.

I accomplish this evaporation without deleterious overheating by a procedure including hashing or grinding the fat tissue to the size of one-eighth inch cubes or somewhat smaller, to produce a free-flowing and readily handled pulp; then heating of this pulp quickly to a temperature in the neighborhood of 120° F. and the showering or dispersing of the thus heated pulp in a container where the absolute pressure is 3.44 inches of mercury or less. So long as the external pressure is below the saturation or vapor pressure of water at the temperature of the pulp tissue, evaporation of moisture can be obtained in an effective degree even though the temperature to which the material is heated is somewhat less than 120° F. The liberated water vapors are drawn off immediately by the vacuum pump that maintains the low pressure in the evaporation container.

It is quite desirable that the material be subjected to the evaporating step very quickly after it attains its maximum temperature, in order to minimize enzymatic action and undesirable modification of the fat and protein constituents of the adipose tissue. Prompt evaporation induces immediate cooling of the material, this being accomplished as an incident to the evaporation of moisture from the tissue. The prompt cooling presents a breakdown of the fat and hence denaturing and de-watering of the proteins may be definitely limited and controlled. It also appears that the immediate separation of the water vapors from the residual oil and tissue disposes of odor-producing elements and as a result the rendered fat does not have objectionable "animal" or "piggy" odor sometimes obtained when utilizing traditional rendering processes with heterogenous mixtures of swine adipose tissue.

By way of explaining how this method may be practiced on a commercial scale for quantity production, reference is had to the accompanying drawing, which serves to illustrate one type of apparatus as well as certain details of it, which facilitate the process. In this illustration, the reference numeral 2 designates a grinder or hasher in which the fresh animal fatty-tissue may be hashed or subdivided into pieces of the order of one-eighth inch cubes or, preferably, smaller (hereinafter referred to as "mincing"). In a suitable grinder or hasher of this character the material may be reduced to a freely flowable pulp, and to contribute to its fluidity, it may be slightly warmed incident to the mincing operation by having the machine equipped with a water jacket through which heated water may be circulated as by pipes 3 and 4. Under control of a valve 5, the pulped material may be conveyed through a conduit 6 to the intake of a pump 8, and by this pump it is propelled under pressure through a conduit 9 to a heater which is designated generally by the reference character 10. The heater may be supplied with hot water from a line 11, the spent heating fluid being withdrawn via line 12. This heater has a double-walled casing 32 which is heat insulated by means of heat insulating filling 34 which is itself sealed in the fluid-tight double-walled casing 32. Within casing 32 is a nest of tubes 35 which are mounted in an upper tube sheet 36 and lower tube sheet 37, the fluid pulp from the conduit 9 being distributed to the tubes 35 in a header or manifold 31 below their lower ends. A baffle or distributing sleeve 33 encompasses the tubes 35 within the casing 32 for the purpose of distributing the hot water from line 11 and requiring it first to impinge the tubes adjacent their upper ends, whence it flows downwardly along them to the outlet line 12.

The tubes open at their upper ends into an air-tight drum or casing 14, which is formed so as to drain to a discharge conduit 7. A vacuum line 19 leads off the dome of the drum 14 to a condenser 20 which is served with cooling fluid by lines 21 and 22 and has a discharge line 23 for the condensate. A vacuum pump 25 is provided to evacuate system and to maintain the desired subatmospheric pressure or "vacuum" in the drum 14 during operation. Mounted above the heater and in position to arrest liquid ejected forcibly from the heater tubes 35 is a deflector or target 17, having its under surfaces curved so as to deflect downwardly, the jets of slurry from tubes 35 and in the form of a shower or dispersion. The material is jetted upwardly against plate 17, breaks into a spray and then falls into the sump of drum 14.

The pulp is heated in the course of its flow upwardly through the tubes, and inasmuch as the area of contact of the pulp with the interior heat transfer surfaces of the tubes is quite large in relation to the volume of pulp in them at any given time, the heating of the material is quickly accomplished and as it is very easy to control the temperature of the hot water introduced from line 11, the maximum temperature to which the pulp is heated may be controlled with certainty. Moreover, due to the fluid character of the pulp and to the fact that it becomes still more fluid as its temperature is raised, plus the fact that a relatively high vacuum is maintained within the drum 14, it will be seen that the amount of air in contact with the pulp while it is being heated is very small. The column of pulp in the tubes and the friction between the flowing pulp and the tube walls, exert a pressure head against which the pump pressure is exerted. As a result the pulp in the tubes is under a pressure appreciably higher than that maintained in the drum 14 above the tube outlets.

The pump 8 is of capacity and power such as to propel the pulp upwardly through the tubes 35 with pressure and velocity enough to expel it from the upper ends of the tubes in forcible jets having such velocity that the material is dashed against the target 17, and the pulp is thereby broken into a shower of droplets and particles, which in the aggregate present a very high ratio of surface exposure. Consequently, with the pressure within the drum 14 at a point below the vapor pressure of water at the temperature of the pulp at the time it is ejected from the tubes, evaporation of moisture from the dispersed particles takes place very quickly, as does also the separation of the vapor from their exposed surfaces. Since the droplets of pulp fall downwardly while the vapors move upward under the influence of the evacuating devices, it will be appreciated that removal and withdrawal of the vapors from the proximity with the fat is very rapid. The vapors are withdrawn from the drum into the condenser 20 in which they are condensed, the condensate being discharged to a suitable closed receptacle 26.

The shower of oil and tissue composing the partially dehydrated pulp collects in the sump of drum 14, but when collected the pulp is at an appreciably lower temperature than when it was jetted from the heater tubes 35, due to the cooling incident evaporation of part of the water therein. The primary purpose of heat insulating the heater 10 with heat insulation 34 is to limit reheating of the material while it is in the sump of container 14, thereby safeguarding the proteinaceous fraction of the fatty pulp from deleterious changes which might otherwise occur if they were permitted to reach a higher temperature. The fatty pulp collected in the sump is kept at a temperature just sufficient to maintain it in flowable condition so as to permit it to flow through the discharge conduit 7.

Valve 28 is maintained open and valve 5 closed while the batch is recirculated, over and over again by pump 8. At each pass the moisture content is reduced and as the desired minimum moisture content is approached, the temperature of the batch in the sump of container 14, tends to rise due to the lesser cooling effected by the diminishing evaporation. However, this appears not to expedite enzymatic action on the fat, due perhaps to the concurrent depletion of moisture.

The flow path from the conduit 7 is controlled by three-way valve 28, which may be set to conduct the pulp back to the intake of pump 8 by way of branch 42, or to discharge the pulp to the draw-off branch 43. With the valve 5 closed and the valve 28 set to return the material to pump 8, a closed circuit for circulation of the pulp is established, this circuit being through the pump 8, heater tubes 35, drum 14, discharge conduit 7, and back to the pump by way of the valve 28 and branch 42. Accordingly, by repeated circulation through this closed path, the pulp is subjected repeatedly to the cycle of treatment wherein the steps are heating, dispersing under reduced pressure to induce evaporation of moisture, separation of the resulting vapor from the oils and solids, and coalescing of the cooled oil and solids in a flowable body of pulp at a temperature too low to produce discernible deleterious effects in them in the period they are held in the pool. The temperature permissible in the pool may vary, but for best results should be kept at about 110° F.

In this fashion the evaporation may be carried to the point where the amount of moisture in the tissue is reduced to a proportion which will effectuate release of the maximum proportion of fat, viz., as in the explanation given above, to a condition such that the residual moisture constitutes from 19% to 22% of the weight of the pressed cracklings, or otherwise stated the moisture should be, from 26% to 30% of the weight of the fat-free tissue solids of a sample of the pulp in drum 14. During the course of the treatment samples of the material may be taken from the circuit at a point between the pump and the heater and pressed and tested for the purpose of ascertaining its condition as to moisture content.

It is to be observed that by this repetitive treatment, the method may be carried out in installations which have large volumetric or batch capacity without subjecting any of the material to prolonged heating, this due to the fact that a relatively small fraction of the material is heated separately from the balance of the material and then promptly cooled again after being heated.

When the moisture reduction has been carried to the desired point, the three-way valve 28 may be set to close communication from conduit 7 to branch 42 and open it to draw-off branch 43, whereupon the material in drum 14 is discharged onto a suitable screen or the like for drainage of the oil from the solid tissue. The material remaining in the heater tubes and in the pump 8 may be likewise withdrawn through suitable draining outlets, exemplified by valve 45. After being thus drained, the components remaining on the screen may be subjected to a mechanical extracting operation, as in a centrifuge or press, for removal of as much of the remaining oil as is mechanically extractable. The oil may be cooled in conventional manner and forms solidified lard.

For consistent results it is highly important that the procedure be carried out under conditions in which the material is properly protected from contamination, and as one source of such contamination may be residue remaining in the apparatus from a previous use, it is quite important that the installation be of a nature such that it may be completely and thoroughly flushed and cleaned at the end of each period of operation. Hence, the importance of providing easy access for flushing and liberal drainage outlets for drawing-off the treated material and the cleaning water from all parts of the apparatus.

Many obvious variations will occur to those skilled in the art and are considered within the purview of the invention claimed.

I claim:

1. A process for recovering fat from animal body tissue which comprises comminuting the fatty tissue of animals to a pulp such that it may be handled as a slurry when heated, maintaining a body of said comminuted fatty tissue at a temperature above the melting point of the fat therein but materially below 126° F., withdrawing a stream of said comminuted fatty tissue and subjecting said stream to the steps of passing said stream at high velocity in indirect heat exchange relationship with a heating medium to raise the temperature of said stream appreciably above the temperature of said body but insufficient to denature appreciably any of the protein content of said tissue and not in excess of 126° F., immediately flashing said heated stream into a zone maintained at a pressure less than the vapor pressure of water at the temperature of the stream to rapidly cool said stream by evaporation to a reduced temperature approximating that of said body, returning said stream to said body, continuing to withdraw a stream from said body and to subject it to said steps until the moisture content of the tissue is 25–35% of the weight of the fat-free tissue solids and separating the thus liberated fluid fat from the tissue solids.

2. A process for recovering fat from animal body tissue which comprises comminuting the fatty tissue of animals to a pulp such that it may be handled as a slurry when heated, forming a body of said comminuted fatty tissue at a temperature slightly above the melting point of the fat therein, withdrawing a stream of said comminuted fatty tissue and subjecting said stream to the cyclic steps of passing said stream at high velocity in indirect heat exchange relationship with a heating medium to raise the temperature of said stream within the approximate range of 120°–126° F., immediately thereafter dispersing said stream by impact into a zone maintained at a pressure less than the vapor pressure of water at the temperature of the stream to disperse the stream into the form of droplets and to rapidly cool said stream by evaporation of water from said stream, thereby reducing the temperature of said stream to one approximating that of the body, returning said stream to said body, continuing to subject a stream from said body to said cyclic steps until the moisture content of the tissue has been reduced to 25 to 35% of the weight of the fat-free tissue solids and thereafter separating the thus liberated fluid fat from the tissue solids.

3. The process according to claim 2 in which the body of comminuted fatty tissue is maintained at a temperature approximating 110° F.

4. The process according to claim 2 in which the moisture content of the tissue is reduced to 26 to 30% of the weight of the fat-free tissue solids.

5. The process for recovering fat from animal body tissue which comprises comminuting the fatty tissue of animals to a pulp such that it may be handled as a slurry when heated, maintaining a body of said comminuted fatty tissue at a temperature of about 110° F., withdrawing a stream of said comminuted fatty tissue from said body, passing said stream at high velocity in indirect heat exchange relationship with a heating medium at a pressure greater than the vapor pressure of the water in said stream at said temperature, rapidly to raise the temperature of said stream to within the approximate range 120°–126° F., immediately thereafter impinging said high velocity stream by impact into a zone maintained at a pressure less than the vapor pressure of water at the temperature of the stream to disperse said stream in the form of droplets and thereby rapidly evaporate water from said stream to cool said stream to a reduced temperature approximating that of said body, returning said stream to said body and repeating the treatment of a withdrawn stream until the moisture content of the tissue is reduced to within 26 to 30% of the weight of the fat-free tissue solids, and separating the thus liberated fluid fat from the tissue solids.

6. The process according to claim 5 in which the animal fatty tissue is derived from swine.

7. The process according to claim 5 in which the animal tissue is a heterogeneous mixture of cutting and killing fats of swine.

JAY C. HORMEL.

REFERENCES CITED

The following references are of record in the file of this patent:

UNITED STATES PATENTS

| Number | Name | Date |
|---|---|---|
| 137,564 | Paraf | Apr. 8, 1873 |
| 153,999 | Andrew | Aug. 11, 1874 |
| 1,394,736 | Kamrath | Oct. 25, 1921 |
| 1,735,980 | Sadtler | Nov. 19, 1929 |
| 1,760,059 | Hiller | May 27, 1930 |
| 1,966,181 | Lowry | July 10, 1934 |